(12) United States Patent
Much et al.

(10) Patent No.: US 8,718,316 B2
(45) Date of Patent: May 6, 2014

(54) STRUCTURE FOR SUPPORTING AN AUDIO RECEIVER COMPONENT OF A COMPUTING DEVICE

(75) Inventors: Michael Much, San Jose, CA (US); David Klawon, San Jose, CA (US); Sagar Savant, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1255 days.

(21) Appl. No.: 12/568,518

(22) Filed: Sep. 28, 2009

(65) Prior Publication Data
US 2011/0059717 A1 Mar. 10, 2011

Related U.S. Application Data

(60) Provisional application No. 61/240,278, filed on Sep. 7, 2009.

(51) Int. Cl.
*H04R 25/00* (2006.01)

(52) U.S. Cl.
USPC ....... 381/386; 381/345; 381/351; 379/433.02

(58) Field of Classification Search
USPC ................. 381/345, 349, 351, 353, 354, 386; 379/420.02, 430, 433.02, 432; 455/569.1, 575.1, 90.3, 350
See application file for complete search history.

(56) References Cited

U.S. PATENT DOCUMENTS

| | | | |
|---|---|---|---|
| 6,002,949 A * | 12/1999 | Hawker et al. | 455/569.1 |
| 6,490,361 B1 * | 12/2002 | Klein | 381/353 |
| 6,658,110 B1 * | 12/2003 | Andersen | 379/433.02 |
| 7,092,745 B1 * | 8/2006 | D'Souza | 455/575.1 |

* cited by examiner

*Primary Examiner* — Huyen D Le
(74) *Attorney, Agent, or Firm* — Mahamedi Paradice Kreisman LLP

(57) ABSTRACT

A computing device comprises a platform and an audio receiver component. The audio receiver component is provided on a front side of the platform and is oriented to emit sound out of the front of the housing. A gap volume adjacent to the audio receiver is defined by the front side of the platform and the front façade of the housing. The gap volume supports audio output from the audio receiver component. A first air channel is defined by a combination of (i) a through-hole in the platform at the gap volume, and (ii) an opening in a back façade of the housing.

11 Claims, 3 Drawing Sheets

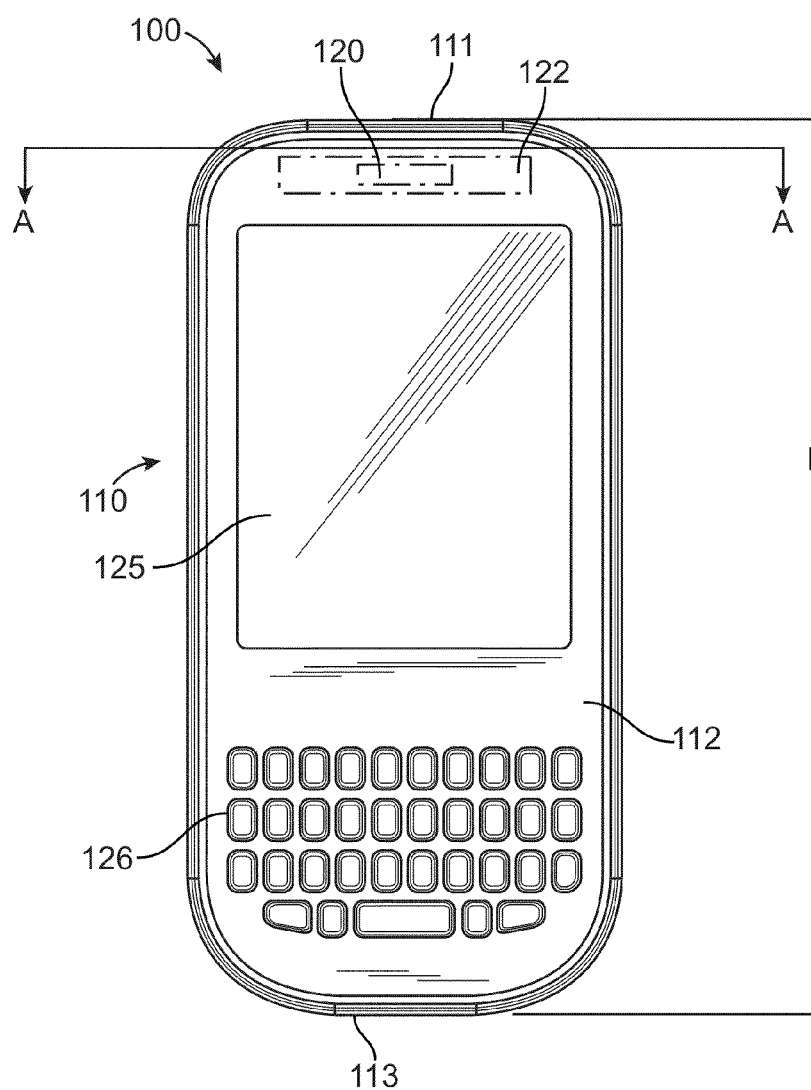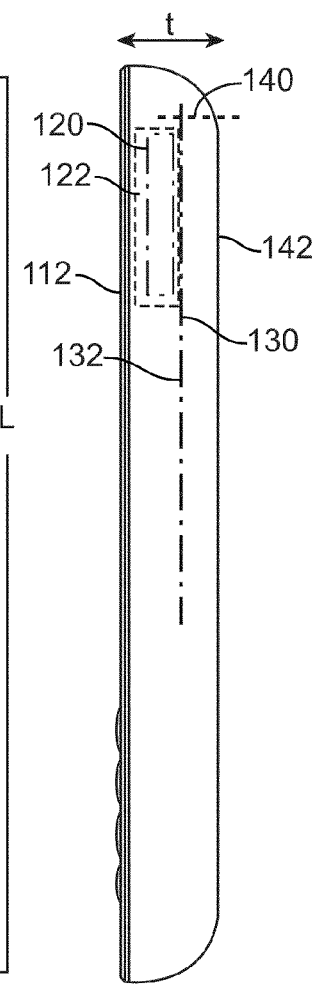
FIG. 1
FIG. 2

STRUCTURE FOR SUPPORTING AN AUDIO RECEIVER COMPONENT OF A COMPUTING DEVICE

RELATED APPLICATIONS

This application claims benefit of priority to Provisional U.S. Patent Application No. 61/240,278, filed Sep. 7, 2009, entitled STRUCTURE FOR SUPPORTING AN AUDIO RECEIVER COMPONENT OF A COMPUTING DEVICE, which is hereby incorporated by reference in its entirety.

TECHNICAL FIELD

The disclosed embodiments relate generally to computing devices, and more particularly, to a structure for supporting an audio receiver component of a computing device.

BACKGROUND

An audio receiver component is a source of audio output for computing devices, such as with mobile devices that are used for telephony. With mobile computing devices, numerous enhancements have been made to the manner in which the audio receiver component is housed within a mobile device. Prior approaches to housing an audio receiver component have had to balance structural considerations with the need to efficiently produce quality audio. Some past approaches have provided for sealing the volume to the rear of the audio receiver component ("rear volume"). Still, other approaches have incorporated air leaks into the rear volumes, while other approaches have relied on a multiple port structure in the rear volume to introduce resonant effects at specific ranges in the audible bandwidth. Each of these conventional approaches have drawbacks.

For example, a majority of mobile devices use a sealed rear volume, positioned opposite to the direction that sound is output from the receiver component. The sealed rear volume enables the receiver component to output audio, but severely limits the pre-filtered bandwidth of the system at low frequencies (<500 Hz). This creates the need for aggressive digital signal processing (DSP) filtering to bring the system's frequency response within passing range of mandated tolerance masks. The need for DSP filtering is an added cost, and consumes battery and software resources.

Other audio receiver component designs implement a so-called leaky rear volume. There are many problems with an uncontrolled/leaky rear volume. First, if the receiver rear volume has an uncontrolled leak into the housing of the device, the device becomes much more susceptible to echo because an internal path is created between the device's receiver and its microphone. Although the internal leak may help gain back some bandwidth at low frequencies, there may be other parasitic resonance effects created.

Still further, another approach has been to include multiple port structures into the receiver rear volume. However, in a device with a 'candy bar' configuration, the additional ports are generally located next to the main receiver port (adjacent to the user's ear). Such an approach unnecessarily reduces the efficiency of the receiver system.

BRIEF DESCRIPTION OF THE DRAWINGS

FIG. 1 illustrates a mobile computing device that is structured to support an audio receiver component, in accordance with embodiments described.

FIG. 2 is a side view of a mobile computing device such as shown in FIG. 1, under an embodiment.

DETAILED DESCRIPTION

Figure 3:
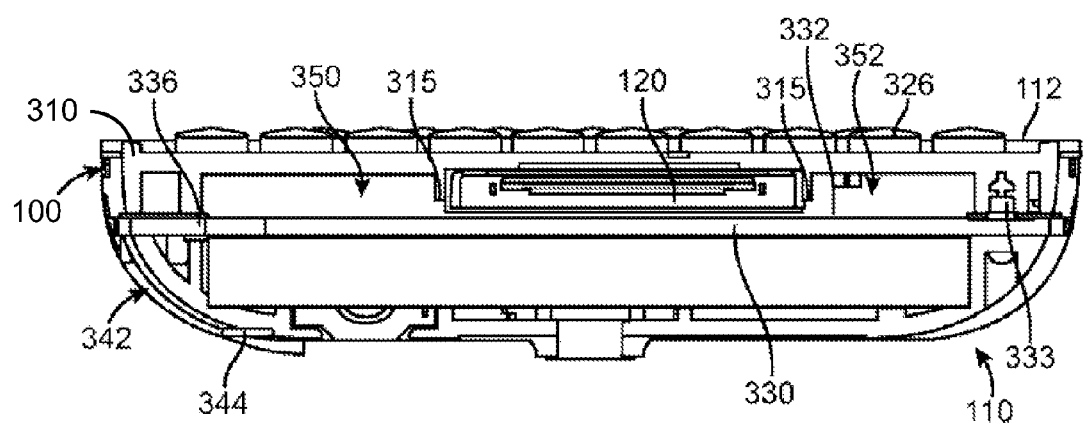
FIG. 3 is a top cross-sectional view of the mobile computing device of FIG. 1, as viewed along lines A-A, under an embodiment.

Embodiments described herein structure the use of an audio receiver component in a housing of a computing device in order to form a support air volume for the receiver component that leverages available space within the housing. Additionally, embodiments described herein include use of one or more air channels, in connection with the support volume, to enable a controlled leak from the support volume when the audio receiver component is in operation. The use of the controlled leak improves audio quality, particularly at low bandwidths.

According to one or more embodiments, a computing device is provided that includes a housing, a platform, and an audio receiver component. The platform may correspond to a structure that supports and electrically interconnects components such as a processor and memory resources. The audio receiver component is provided on a front side of the platform and is oriented to emit sound out of the front of the housing. A gap volume adjacent to the audio receiver is defined by the front side of the platform and the front façade of the housing. The gap volume supports audio output from the audio receiver component. A first air channel is defined by a combination of (i) a through-hole in the platform at the gap volume, and (ii) an opening in a back façade of the housing.

In still another embodiment, an audio receiver component is provided on a front side of a platform, within the housing of the computing device. The platform is structured relative to a front portion of the housing to include a front-side and partitioned support volume for the audio receiver component. At least one of the housing or the platform includes one or more air channels for exchanging air with the support volume.

FIG. 1 illustrates a mobile computing device that is structured to support an audio receiver component, in accordance with embodiments described. In an embodiment, computing device 100 includes housing 110, having front façade 112 on which a display surface 125 (e.g. touch-screen or LCD) is provided. Features such as a keyboard 126 (or keypad), buttons, touch-sensors and other input features may be incorporated into the device 100. The mobile computing device 100 may correspond to, for example, a mobile telephony/data messaging computing device, such as a cellular phone or mobile device with voice-telephony capabilities (sometimes called "smart phone"). A computing device such as described may be small enough to fit in one hand, while providing cellular telephony features in combination with other applications, such as messaging, web browsing, media playback, personal information management (e.g. such as contact records management, calendar applications, tasks lists), image or video/media capture and other functionality.

According to one or more embodiments, the housing 110 encapsulates components that include, for example, a substrate or printed circuit board, processor, memory, display components, and audio components. The housing 110 may also house or otherwise provide one or more accessory interfaces, such as connector ports (e.g. female micro- or mini-USB connectors) or memory card slots. The accessory interfaces may be used to extend connectors, cables and other devices to the computing device. According to some embodiments, the housing 110 is monolithic. The term monolithic in the context of housing for the computing device means that housing is not segmented to vary in length or width.

In an embodiment, housing 110 includes length L extending from a top edge 111 to a bottom edge 113. As mentioned, a primary use of the device 100 is to enable telephony. For such purpose, device 100 includes an audio receiver component 120 (shown in phantom) embedded within the housing 110 to produce audio output (e.g. caller speaking). As described by embodiments, the device 100 is structured with housing and internal features to provide support volume and air channels for the audio receiver component 120. In particular, the device 100 provides a partitioned, front-side support volume in an interior region 122. One or more additional air channels (not shown) port the support volume of the interior region 122 to provide a partitioned support volume that has a controlled leak.

FIG. 2 is a side view of mobile device 100, showing audio receiver component 120 and the interior region providing its support volume, according to an embodiment. The audio receiver component 120 is provided on a platform 130, such as with a circuit board or other component support/interconnect structure of the computing device 100. A thickness of the mobile computing device 100 is defined by the dimension between the front façade 112 and the rear façade 142. The audio receiver component 120 is mounted to a front side 132 of platform 130. According to embodiments, an interior support volume for the audio receiver component 120 is also front-side with respect to platform 130. One or more air channels 140 are formed through the platform 130 and rear façade 142 to enable the support volume to have a controlled leakage.

Among other benefits, the use of the front-side support volume for the audio receiver component 120 enables the thickness t of the mobile device 100 to be reduced. Additionally, the support volume, in combination with air channel 140, enables the audio receiver component 120 to efficiently perform at necessary frequencies, with minimal echo or other acoustic issues that are problematic with many of the conventional approaches.

FIG. 3 is a top cross-sectional view of computing device 100, as viewed along lines A-A of FIG. 1, under an embodiment. With reference to FIG. 3, front façade 112 of housing 110 includes various features, including key structures 326 of the keyboard. The front façade 112 is defined in part by a front shell 310 that forms a portion of the overall housing 110. In an implementation shown, the front shell 310 is secured to a rear shell 342 using, for example, mechanical fasteners 333. A platform structure 330 is disposed between the front shell 310 and back shell 342. The platform structure 330 is extended within the device to support and electrically interconnect various internal components, switches and circuitry.

In an embodiment, the audio receiver component 120 is mounted to a front side 332 (faces the front shell 310) of platform 330. Retention structures 315 of the front shell 310 facilitate in securing the audio receiver component 120 in place. The spacing between the underside of the front shell 310, and the front side 332 of the platform structure 332 creates a gap volume that is then partitioned by the presence of the audio receiver component 120 and/or retention structures 315. As a result of the partition, a first gap volume 350 is positioned on one side (e.g. left) of the audio receiver component 120, and a second gap volume 352 is positioned on the other side (e.g. right).

According to an embodiment, the first and second gap volumes 350, 352 are not sealed, but enable the exchange of air between the respective volumes. An air channel from the first gap volume 350 is extended out the back shell 342 via a through-hole 336 in the platform 330. A corresponding pressure relief hole 344 may be formed in the back shell 342. Together, the pressure relief hole 344 of the back shell 342 and the through-hole 336 in the platform 330 combine to form an air channel. The air channel, as used with embodiments described herein, corresponds to a unconstrained conduit or guide that enables the passage of air. Thus, while it is possible to create air channels that constrain air flow, embodiments described provide for air channels that enable relatively unconstrained or guided air flow. In an embodiment shown, air for supporting operation of the audio receiver component 120 is maintained in the respective gap volumes 350, 352, and exchanged with the outside of the device via the through-hole 336 and relief pressure hole 344.

In an embodiment, more than one air channel may be formed to support the gap volumes of the audio receiver component 120. In particular, according to a variation, the first and second gap volume 350, 352 are sealed from one another. In such implementation, each gap volume 350, 352 may be provided an air channel, formed by, for example, including an additional through-hole in the platform 330, as well as including an additional pressure relief hole in the back shell 342.

Figure 4:
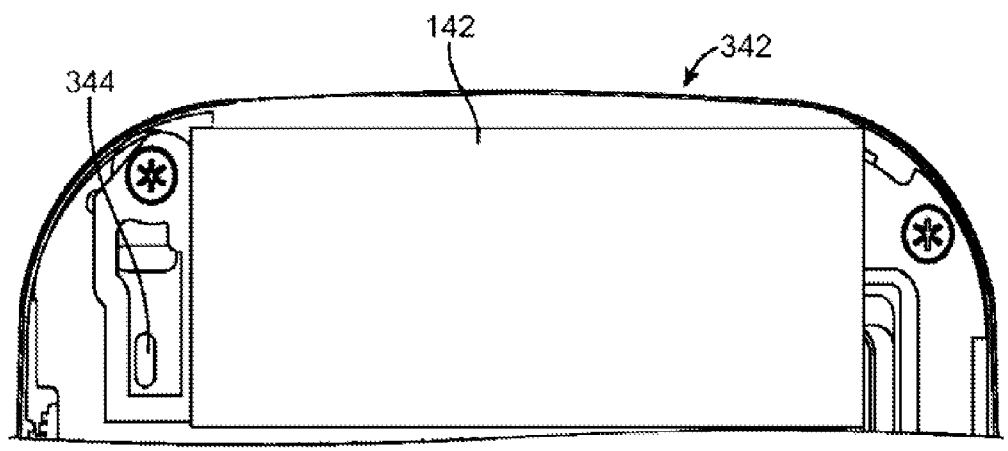
FIG. 4 is a rear perspective of the portion of the computing device that corresponds to the sectional view shown in FIG. 3, under an embodiment.

FIG. 4 is a rear perspective of the portion of the computing device that corresponds to the sectional view shown in FIG. 3, under an embodiment. The rear façade 142 corresponds to the exterior surface of the back shell 342. The relief pressure hole 344 may be formed as a feature on the rear façade 142. In one implementation, the relief pressure hole 344 is provided as a faux feature to disguise its true purpose. For example, a speaker grill may be provided over the relief pressure hole 344 to give the appearance that the relief pressure hole 344 is a speaker.

Figure 5:
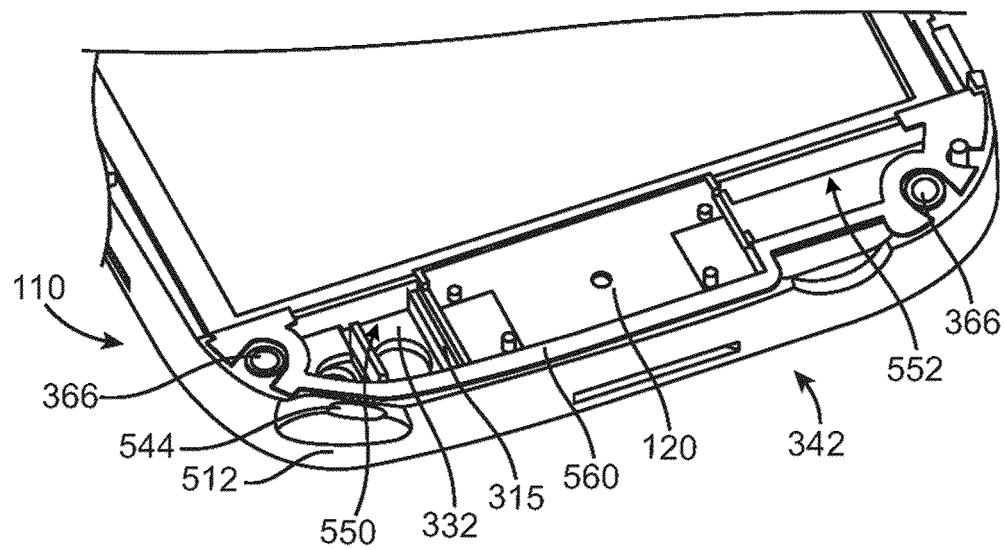
FIG. 5 is a partial interior view of an unassembled computing device, according to one or more embodiments.

FIG. 5 is a partial interior view of the housing 110 (FIG. 1) in unassembled form, under an embodiment. The platform 330 is secured to the bottom shell 342, with the top shell (not shown in the figure) to be secured using fasteners that engage fastener holes 366, 366. The audio receiver component 120 is mounted onto the platform 330 and secured by the retention structures 315. A first region 550 corresponding to the first gap volume 350 (FIG. 3), and a second region 552 corresponding to the second gap volume 352 (FIG. 3) are provided on either side of the audio receiver component 120. As shown, the first region 550 includes the through-hole 336.

In order to enable housing 110 to be sealed, gasket layers 560 may be provided on select surfaces of the platform 330 or its structures. In an embodiment depicted by FIG. 5, gasket layers 350 align over perimeter regions of the bottom shell 342. One result is that when housing 110 is assembled, the first and second gap volumes 350, 352 (FIG. 3) are not sealed from one another. Rather, airflow extends between the respective gap volumes, as partially provided by first and second region 550, 552. In this way, the first and second gap volumes 350, 352 are fluidically coupled.

As a variation to an embodiment such as described with FIG. 5, an additional or alternative relief pressure hole 544 may be formed into the bottom shell 342 at a point that is front-side with respect to platform 330. For example, the additional relief pressure hole 544 may be formed on a bottom edge façade 512 or corner of the bottom shell 342. The alternative relief pressure hole 544 may supplement or replace the air channel formed by the through-hole 336 and relief pressure hole 344 (see FIG. 3).

Figure 6:
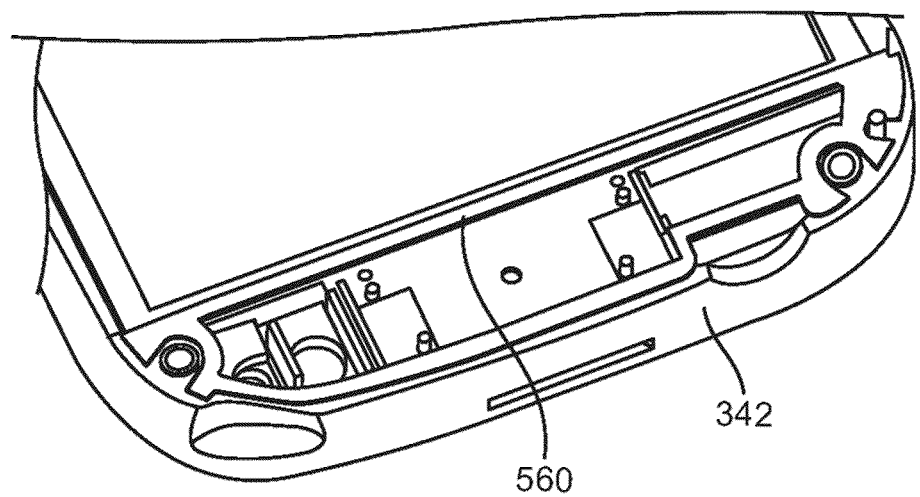
FIG. 6 illustrates an alternative interior view of the audio receiver component mounted onto the platform, according to another embodiment.

FIG. 6 illustrates an alternative interior view of the audio receiver component 120 mounted onto the platform, according to another embodiment. In an embodiment of FIG. 6, the gasket layer 560 extends to interior surfaces of the bottom shell 342, to substantially seal the first gap volume 350 (FIG. 3) from the second gap volume 352 (FIG. 3).

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A computing device comprising:
    a housing;
    a platform provided between a front façade of the housing and a back façade of the housing;
    an audio receiver component provided on a front side of the platform, the audio receiver component being oriented to emit sound out of the front façade of the housing;
    a first gap volume and a second gap volume, each of the first gap volume and the second gap volume being adjacent to a different lateral side the audio receiver component and being defined by the front side of the platform and the front façade of the housing, each of the first gap volume and the second gap volume supporting audio output from the audio receiver component, wherein the first gap volume and the second gap volume are sealed from one another; and
    a first air channel and a second air channel, each of the first air channel and the second air channel being formed by a combination of (i) a through-hole in the platform at the corresponding first or second gap volume, and (ii) an opening in the back façade of the housing.

2. The computing device of claim 1, further comprising a first speaker grill and a second speaker grill provided on the back façade of the housing, each of the first speaker grill and the second speaker grill to cover the corresponding opening in the back façade of the housing.

3. The computing device of claim 1, wherein the platform corresponds to a circuit board.

4. The computing device of claim 1, further comprising a retention structure to secure the audio receiver component that is provided on the front side of the platform.

5. The computing device of claim 4, further comprising a gasket layer, positioned to facilitate sealing the first gap volume from the second gap volume.

6. The computing device of claim 4, wherein the housing comprises a front shell and a rear shell, and wherein the retention structure extends from an inner face of the front shell.

7. The computing device of claim 1, wherein the housing is monolithic.

8. A computing device comprising:
    a housing including a front shell having a front façade and a rear shell having a back façade;
    a platform provided between the front façade and the back façade;
    an audio receiver component provided on a front side of the platform, so as to be oriented to emit sound out of the front façade;
    a first gap volume and a second gap volume, each of the first gap volume and the second gap volume being adjacent to a different lateral side the audio receiver component and being defined by the front side of the platform and the front shell, each of the first gap volume and the second gap volume supporting audio output from the audio receiver component, wherein the first gap volume and the second gap volume are sealed from one another; and
    a first air channel and a second air channel, each of the first air channel and the second air channel being formed by a combination of (i) a through-hole in the platform at the corresponding first or second gap volume, and (ii) an opening in the rear shell of the housing.

9. The computing device of claim 8, wherein the platform corresponds to a circuit board.

10. The computing device of claim 8, further comprising a first speaker grill and a second speaker grill provided on the back façade of the housing, each of the first speaker grill and the second speaker grill to cover the corresponding opening in the back façade of the housing.

11. The computing device of claim 8, further comprising a gasket layer, positioned to facilitate sealing the first gap volume from the second gap volume.

* * * * *